(12) United States Patent
Reddy Kothakapu et al.

(10) Patent No.: US 12,615,579 B2
(45) Date of Patent: Apr. 28, 2026

(54) METHOD TO IMPROVE UE PERFORMANCE BY REDUCING SCAN ON LEGACY GSM/WCDMA

(71) Applicant: QUALCOMM Incorporated, San Diego, CA (US)

(72) Inventors: Harish Reddy Kothakapu, Hyderabad (IN); Bhanu Kiran Janga, Hyderabad (IN); Sohrab Ahmad, Hyderabad (IN)

(73) Assignee: QUALCOMM Incorporated, San Diego, CA (US)

(*) Notice: Subject to any disclaimer, the term of this patent is extended or adjusted under 35 U.S.C. 154(b) by 470 days.

(21) Appl. No.: 17/654,788

(22) Filed: Mar. 14, 2022

(65) Prior Publication Data

US 2023/0319690 A1 Oct. 5, 2023

(51) Int. Cl.
*H04W 48/16* (2009.01)
*H04W 84/04* (2009.01)

(52) U.S. Cl.
CPC .......... *H04W 48/16* (2013.01); *H04W 84/042* (2013.01)

(58) Field of Classification Search
CPC .................................................. H04W 48/16
USPC ......................................................... 455/434
See application file for complete search history.

(56) References Cited

U.S. PATENT DOCUMENTS

| | | | | |
|---|---|---|---|---|
| 2007/0207815 | A1* | 9/2007 | Alfano | H04W 48/04 |
| | | | | 455/456.1 |
| 2016/0095021 | A1* | 3/2016 | Yan | H04W 36/0088 |
| | | | | 455/437 |
| 2016/0192251 | A1* | 6/2016 | Chebolu | H04W 76/18 |
| | | | | 455/434 |
| 2017/0070928 | A1* | 3/2017 | Manepalli | H04W 48/20 |
| 2021/0345204 | A1* | 11/2021 | Matolia | H04W 76/16 |

FOREIGN PATENT DOCUMENTS

WO 2017027126 A1 2/2017

OTHER PUBLICATIONS

International Search Report and Written Opinion—PCT/US2023/013359—ISA/EPO—Jun. 1, 2023.

* cited by examiner

*Primary Examiner* — Joel Ajayi
(74) *Attorney, Agent, or Firm* — QUALCOMM Incorporated

(57) ABSTRACT

This disclosure provides systems, devices, apparatus, and methods, including computer programs encoded on storage media, for a scan reduction associated with legacy RATs. A UE may receive, from a database, an indication that a first RAT is unavailable for communications associated with a PLMN. The indication that the first RAT is unavailable may be based on one or more unsuccessful scans for the first RAT. The UE may scan for a second RAT based on a skipped scan for the first RAT. The skipped scan may be based on the indication that the first RAT is unavailable. The UE may communicate with the PLMN based on the scan for the second RAT and the skipped scan for the first RAT.

26 Claims, 11 Drawing Sheets

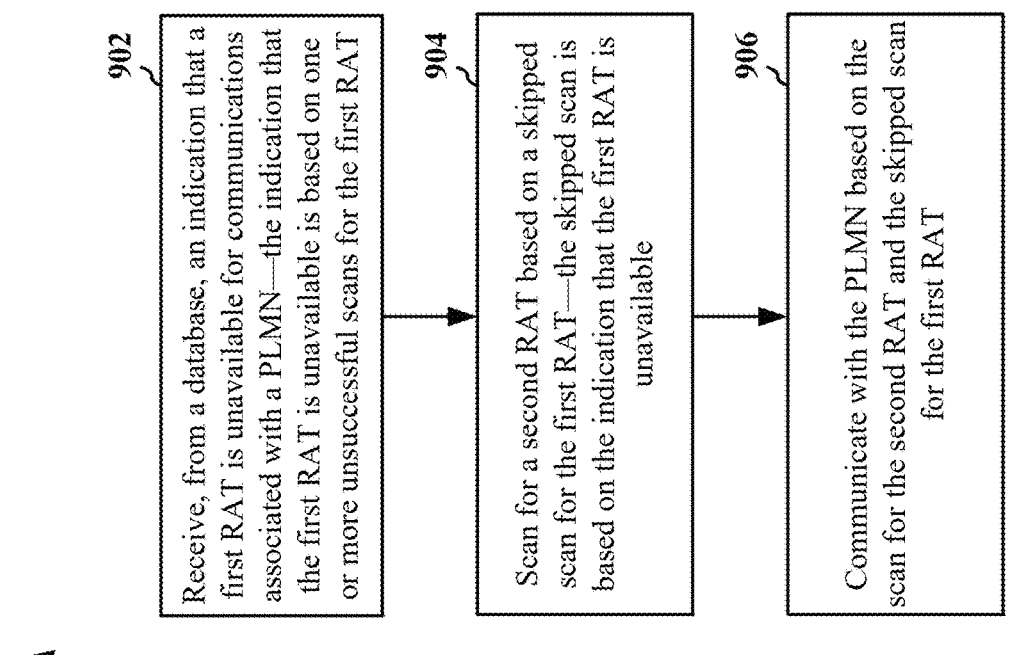

900

902

Receive, from a database, an indication that a first RAT is unavailable for communications associated with a PLMN—the indication that the first RAT is unavailable is based on one or more unsuccessful scans for the first RAT

904

Scan for a second RAT based on a skipped scan for the first RAT—the skipped scan is based on the indication that the first RAT is unavailable

906

Communicate with the PLMN based on the scan for the second RAT and the skipped scan for the first RAT

FIG. 9

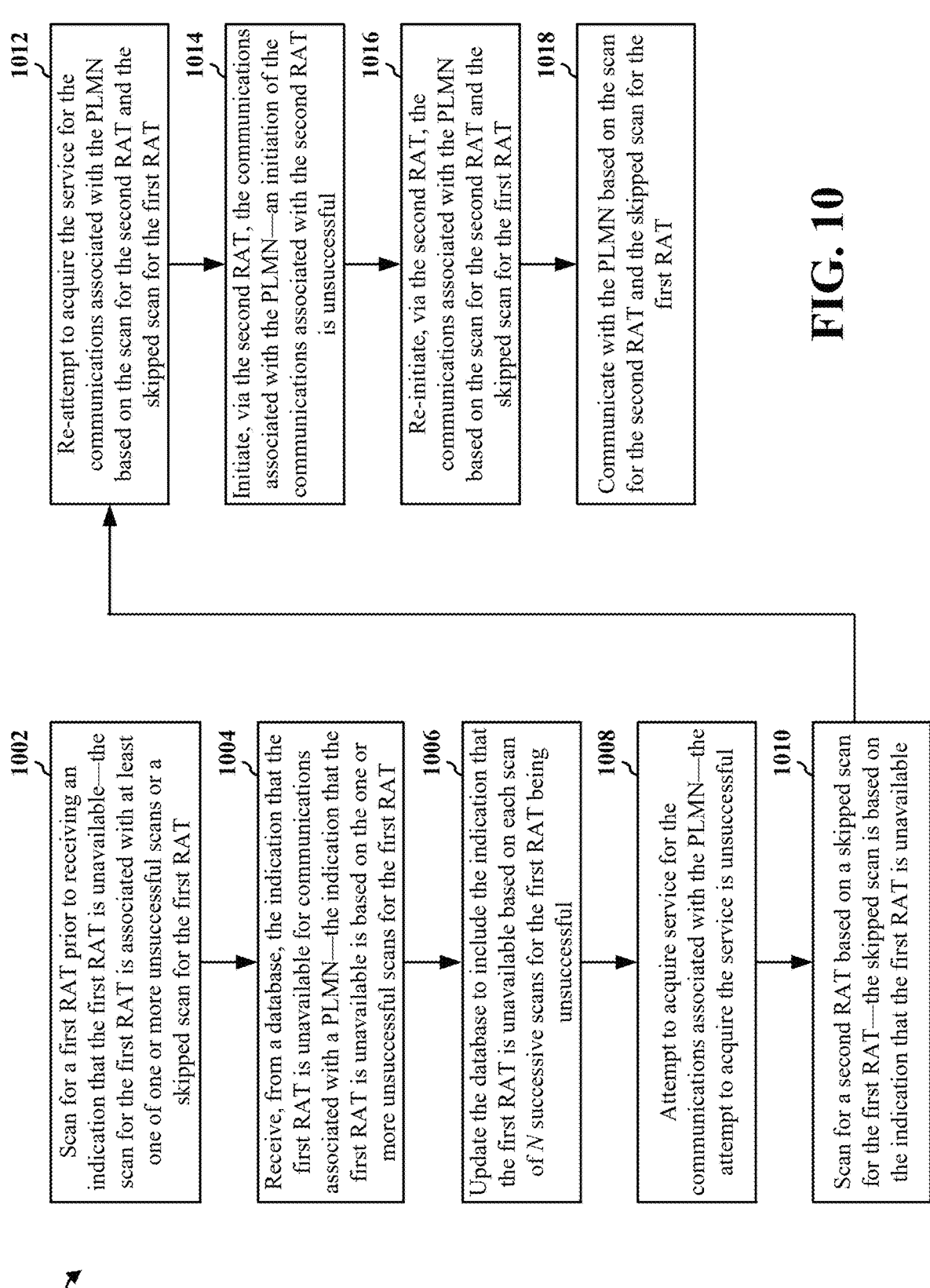

FIG. 10

1012 — Re-attempt to acquire the service for the communications associated with the PLMN based on the scan for the second RAT and the skipped scan for the first RAT 1014 — Initiate, via the second RAT, the communications associated with the PLMN—an initiation of the communications associated with the second RAT is unsuccessful 1016 — Re-initiate, via the second RAT, the communications associated with the PLMN based on the scan for the second RAT and the skipped scan for the first RAT 1018 — Communicate with the PLMN based on the scan for the second RAT and the skipped scan for the first RAT

1000

1002 — Scan for a first RAT prior to receiving an indication that the first RAT is unavailable—the scan for the first RAT is associated with at least one of one or more unsuccessful scans or a skipped scan for the first RAT 1004 — Receive, from a database, the indication that the first RAT is unavailable for communications associated with a PLMN—the indication that the first RAT is unavailable is based on the one or more unsuccessful scans for the first RAT 1006 — Update the database to include the indication that the first RAT is unavailable based on each scan of N successive scans for the first RAT being unsuccessful 1008 — Attempt to acquire service for the communications associated with the PLMN—the attempt to acquire the service is unsuccessful 1010 — Scan for a second RAT based on a skipped scan for the first RAT—the skipped scan is based on the indication that the first RAT is unavailable

METHOD TO IMPROVE UE PERFORMANCE BY REDUCING SCAN ON LEGACY GSM/WCDMA

TECHNICAL FIELD

The present disclosure relates generally to communication systems, and more particularly, to a scan reduction associated with legacy radio access technologies (RATs).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may receive, from a database, an indication that a first radio access technology (RAT) is unavailable for communications associated with a public land mobile network (PLMN), the indication that the first RAT is unavailable being based on one or more unsuccessful scans for the first RAT; scan for a second RAT based on a skipped scan for the first RAT, the skipped scan being based on the indication that the first RAT is unavailable; and communicate with the PLMN based on the scan for the second RAT and the skipped scan for the first RAT.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 9 is a flowchart of a method of wireless communication at a UE.

FIG. 10 is a flowchart of a method of wireless communication at a UE.

DETAILED DESCRIPTION

Figure 1:
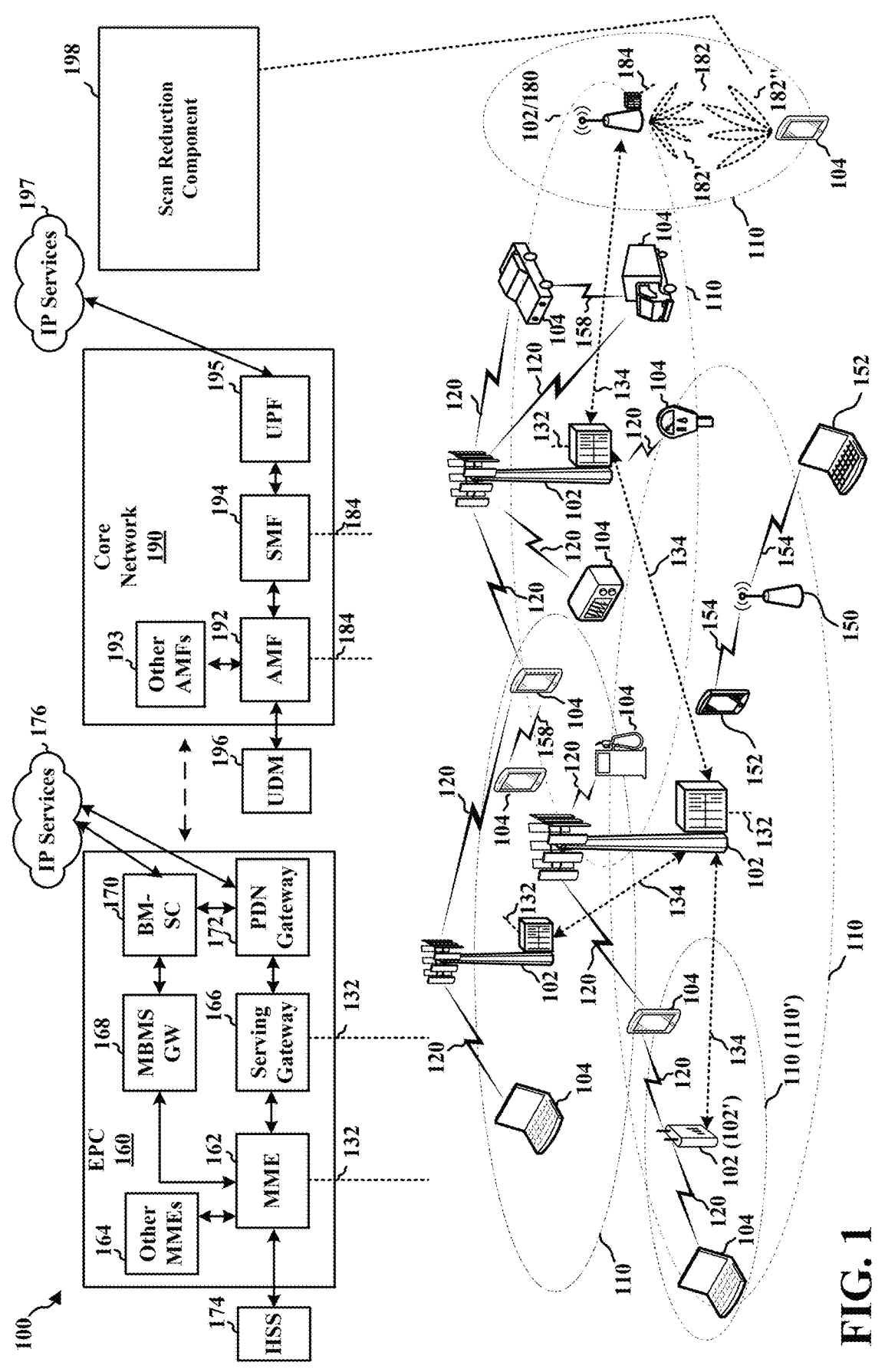
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHZ). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2. FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as a gNB may operate in a traditional sub 6 GHz spectrum, in millimeter wave frequencies, and/or near millimeter wave frequencies in communication with the UE 104. When the gNB operates in millimeter wave or near millimeter wave frequencies, the gNB may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a scan reduction component 198 configured to receive, from a database, an indication that a first radio access technology (RAT) is unavailable for communications associated with a PLMN, the indication that the first RAT is unavailable being based on one or more unsuccessful scans for the first RAT; scan for a second RAT based on a skipped scan for the first RAT, the skipped scan being based on the indication that the first RAT is unavailable; and communicate with the PLMN based on the scan for the second RAT and the skipped scan for the first RAT. Although the following description may be focused on 5G NR, the concepts described herein may be applicable to other similar areas, such as LTE, LTE-A, CDMA, GSM, and other wireless technologies.

Figures 2A, 2B, 2C, 2D:
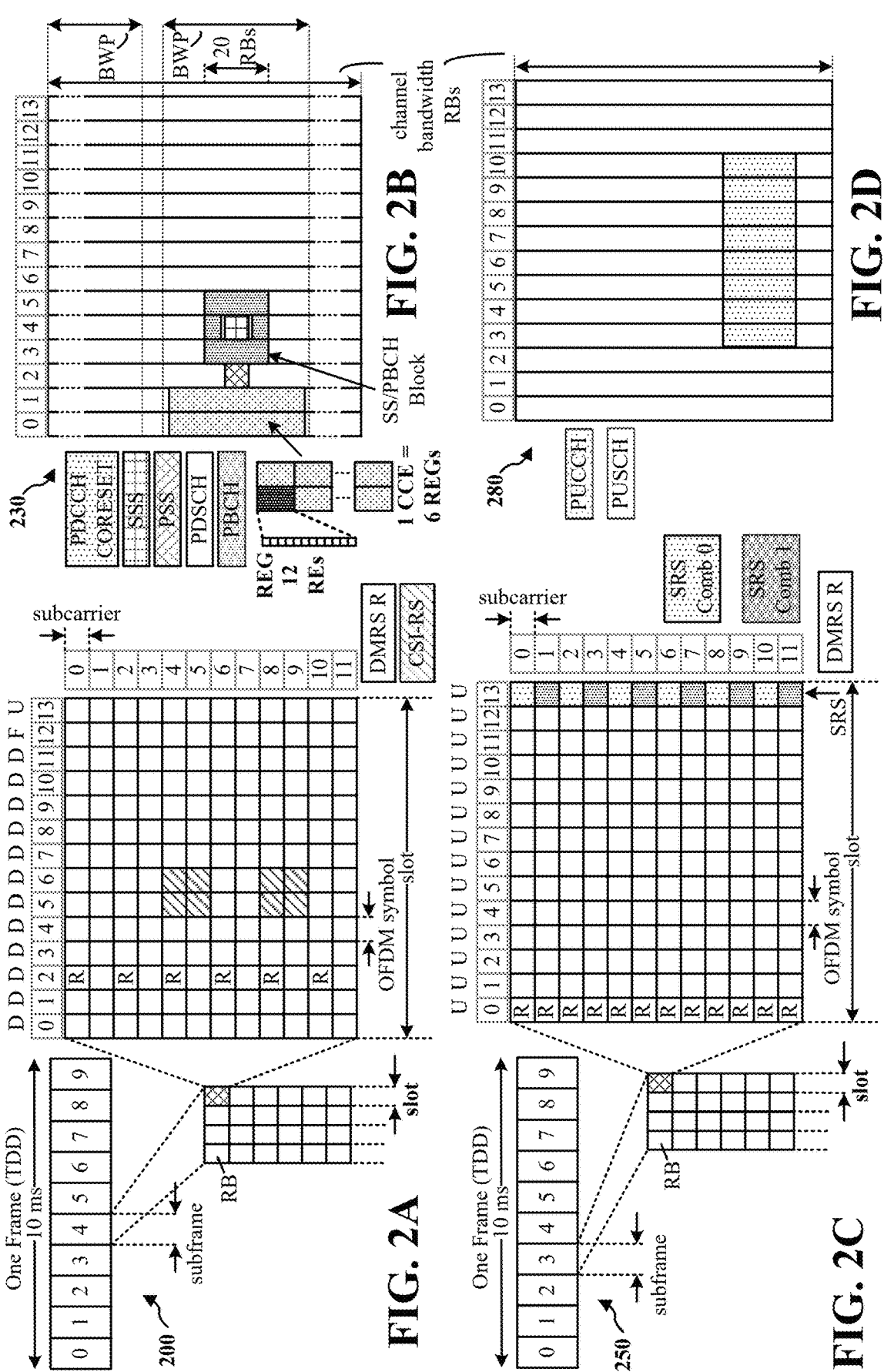
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15[\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
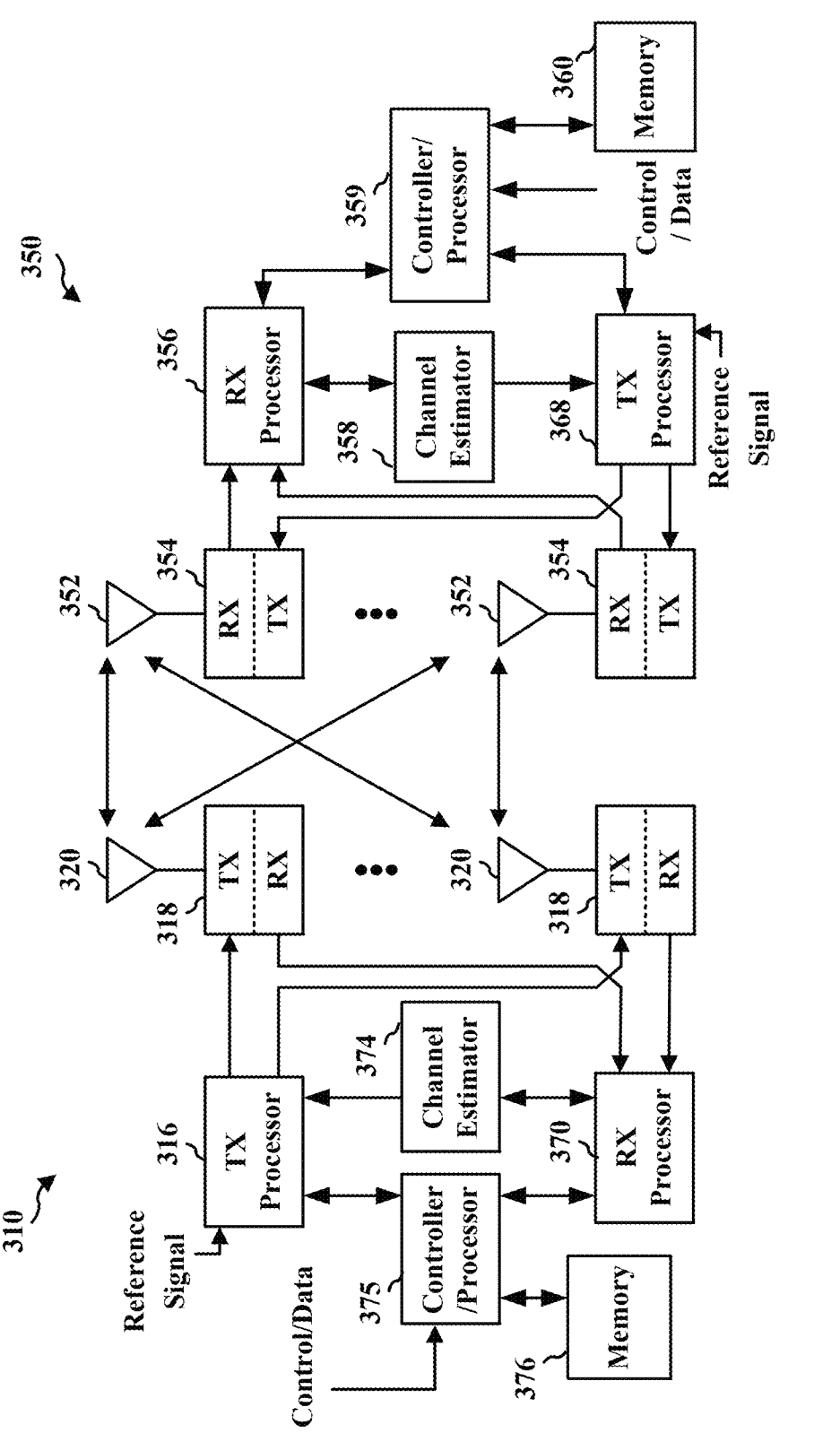
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the scan reduction component 198 of FIG. 1.

Wireless communication systems may be configured to share available system resources and provide various telecommunication services (e.g., telephony, video, data, messaging, broadcasts, etc.) based on multiple-access technologies such as CDMA systems, TDMA systems, FDMA systems, OFDMA systems, SC-FDMA systems, TD-SCDMA systems, etc. that support communication with multiple users. In many cases, common protocols that facilitate communications with wireless devices are adopted in various telecommunication standards. For example, communication methods associated with eMBB, mMTC, and ultra-reliable low latency communication (URLLC) may be incorporated in the 5G NR telecommunication standard, while other aspects may be incorporated in the 4G LTE standard. As mobile broadband technologies are part of a continuous evolution, further improvements in mobile broadband remain useful to continue the progression of such technologies.

Figure 4:
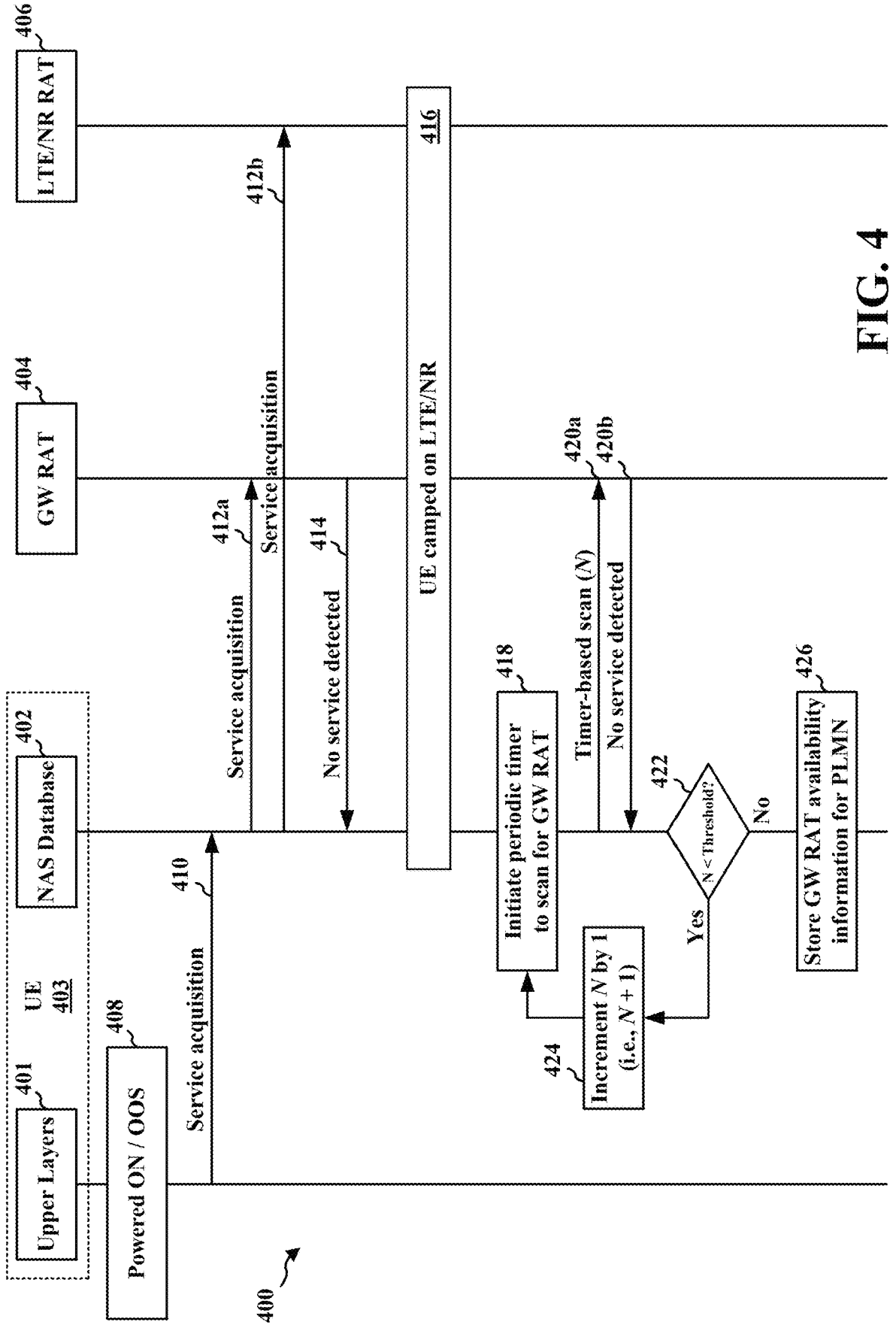
FIG. 4 is a call flow diagram illustrating communications between a plurality of network entities for generating information stored in a database.

FIG. 4 is a call flow diagram 400 illustrating communications between a plurality of network entities for generating information stored in a database. The plurality of network entities may include a global system for mobiles (GSM)/ wideband code division multiple access (WCDMA) (GW) RAT 404, an LTE/NR RAT 406, and a UE 403. The database may correspond to a NAS database 402 that receives communication from upper layers 401.

Telecommunication networks are being deployed with increasing support for LTE RATs and/or NR RATs, thus reducing a dependency on older/legacy RATs, such as the GW RAT 404. "RAT" refers to an underlying physical connection method for a radio-based communication network. Some operators may determine to phase out the older/legacy RATs incrementally before declaring the older/ legacy RATs obsolete. However, in order to provide for full commercialization of UEs during the phase out period, some UEs (e.g., the UE 403) may continue to included GW capabilities in addition to LTE capabilities and/or NR capabilities. Nevertheless, fewer and fewer locations may be utilizing the older/legacy RATs, such as the GW RAT 404, as the primary mode of operation. Hence, a performance of the UE 403 may be improved based on a reduced scan for the older/legacy RATs in locations where such technologies are being phased out or are already phased out.

Since the UE 403 may be configured for GW communications, the UE 403 may attempt to scan for the GW RAT 404 even in locations that no longer support such technologies. Scans for unsupported/unavailable RATs may impact a battery power of the UE 403, delay calls, etc. That is, if the UE 403 supports different types of RATs, such as the GW RAT 403, the LTE/NR RAT 406, etc.), the UE 403 may execute protocols to scan for the different types of RATs during procedures, such as out-of-service (OOS) recovery procedures, voice calls dialed in non-service locations, extended service request (ESR) failures (e.g., unsuccessful attempts to establish radio bearers between the UE 403 and the RATs), silent re-dials of voice call failures, and the like.

The scans for the different types of RATs may increase signaling overhead at the UE 403. The UE 403 may also have a delayed call setup time in locations where the operator has phased out GW service based on scans for the GW RAT 404 that is no longer available at a particular location. If the UE 403 is able to make an advance determination regarding the locations where the GW RAT 404 is no longer available, the UE 403 may skip a scanning procedure for the GW RAT 403 to conserve battery power, reduce signaling overhead, and decrease call setup delays.

If the UE 403 is communicating with the LTE/NR RAT 406, and the communication link fails, a recovery procedure may include scanning for each type of RAT supported by the UE 403. To reduce scanning procedures in locations where the GW RAT 404 is phased out/unavailable, the UE 403 may generate/store information in the NAS database 402, where the information may be indicative of prior attempts to communicate with the GW RAT 404. If a home PLMN/ registered PLMN is not detected in the last N number of scans, a location associated with the last N number of scans may be stored in the NAS database 402 as being an unavailable location for GW communications. Hence, the UE 403 may skip scanning for the GW RAT 404 at such locations during procedures such as OOS recovery procedures, voice calls during OOS conditions, ESR failures, voice calls during silent re-dials after a failure over a packet switched (PS) RAT, etc. "PLMN" refers to a combination of wireless communication services offered by a specific operator (e.g., in a specific country).

In an example, the UE 403 may attempt to initiate a voice call via voice over LTE (VOLTE) or voice over NR (VONR), but if a failure occurs in association with the VOLTE and/or the VONR, the UE 403 may re-attempt the voice call via GW communication as a fallback option. For instance, an ESR may be used by the UE 403 for LTE communications to fallback from LTE to GW for voice calls. By determining in advance via the NAS database 402 that the GW RAT 404 is not available at the location that the UE 403 is re-attempting the voice call, the UE 403 may skip unnecessarily scanning for the GW RAT 404. Unnecessary scans for the GW RAT 404 may even cause the voice call to fail based on a timeout period associated with a search time for the GW RAT 404. Instead, the UE 403 may determine via the NAS database 402 to re-attempt the voice call via VOLTE and/or VONR, which may provide an increased likelihood for successful communication.

In order to generate the information stored in the NAS database 402, the UE 403 may perform a full band scan for all of the RATs supported by the UE 403 over a period of time that the UE 403 is powered ON. For example, based on the UE 403 being powered ON/OOS, at 408, the upper layers 401 may indicate, at 410, a service acquisition request to the NAS database 402. The service acquisition request may also be indicated, at 412a, to the GW RAT 404 and, at 412b, to the LTE/NR RAT 406. At 414, the UE 403 may determine that no service is detected from the GW RAT 404, such that the UE 403 may camp on an LTE/NR cell, at 416.

The NAS database 402 may be updated during the powered ON period of time to indicate whether the home PLMN/registered RPLMN associated with the GW RAT 404 is frequently not detected at the location of the UE 403. If so, the PLMN associated with the scanning location may be stored in the NAS database 402 as an unavailable PLMN for GW communications, which may be used by the UE 403 to skip scans for the GW RAT 404 during subsequent procedures of the UE 403. A PLMN may be added to the NAS database 402 as being an unavailable PLMN, e.g., after a failed number of N consecutive searches for the PLMN performed by the UE 403.

The UE 403 may be located at a number of locations where the UE 403 is OOS. In such cases, the UE 403 may scan for each type of RAT supported by the UE 403 (e.g., the GW RAT 404, the LTE/NR RAT 406, etc.). In an example, the UE 403 may initiate, at 418, a periodic timer to scan for the GW RAT 404, where at, 420a, a timer-based scan of number (N) may be performed for the GW RAT 404 at each expiration of the periodic timer. At 420b, the UE 403 may determine that no service is detected from the GW RAT 404. At 422, if N is less than a threshold number of consecutive scans for which no service is detected, the UE 403 may increment, at 424, a counter for N by 1. For example, a first value of N (e.g., N=1) may be incremented, at 424, to second value of N+1, and the procedures at 418-422 may be repeated. At 422, if N is equal to or greater than the threshold number of consecutive scans for which no service is detected, the UE 403 may store, at 426, GW RAT availability information in the NAS database 402 to indicate that the PLMN is an unavailable PLMN for GW communication.

The NAS database 402 may be generated/updated based on each OOS recovery procedure performed by the UE 403, such that the NAS database 402 may indicate a plurality of occasions where the GW scan was not successful (e.g., the GW RAT 404 was not detected for the PLMN for which the UE 403 performed the scan). The number N of consecutive failures used for updating the database may correspond to a configurable value for N. For instance, if N=3, after 3 consecutive failed scans for the GW RAT 404, the PLMN may be added to the NAS database 402 as an unavailable PLMN for GW communications. The UE 403 may perform periodic background scans for a GW status while camped, at 416, on the LTE/NR cell to determine whether GW communication is available for the PLMN. Each time the UE 403 performs a background scan, at 420a, and fails to detect, at 420b, the GW RAT 404, the UE 403 may increment, at 424, the counter by 1 count. After 3 consecutive counts, in cases where N=3, the PLMN may be stored, at 426, in the NAS database 402 as being unavailable for GW communication. In cases where the GW RAT 404 is detected via a timer-based scan, at 420a, prior to the counter being incremented to 3, in cases where N=3, the counter may be reset to 0 upon each successful detection.

Figure 5:
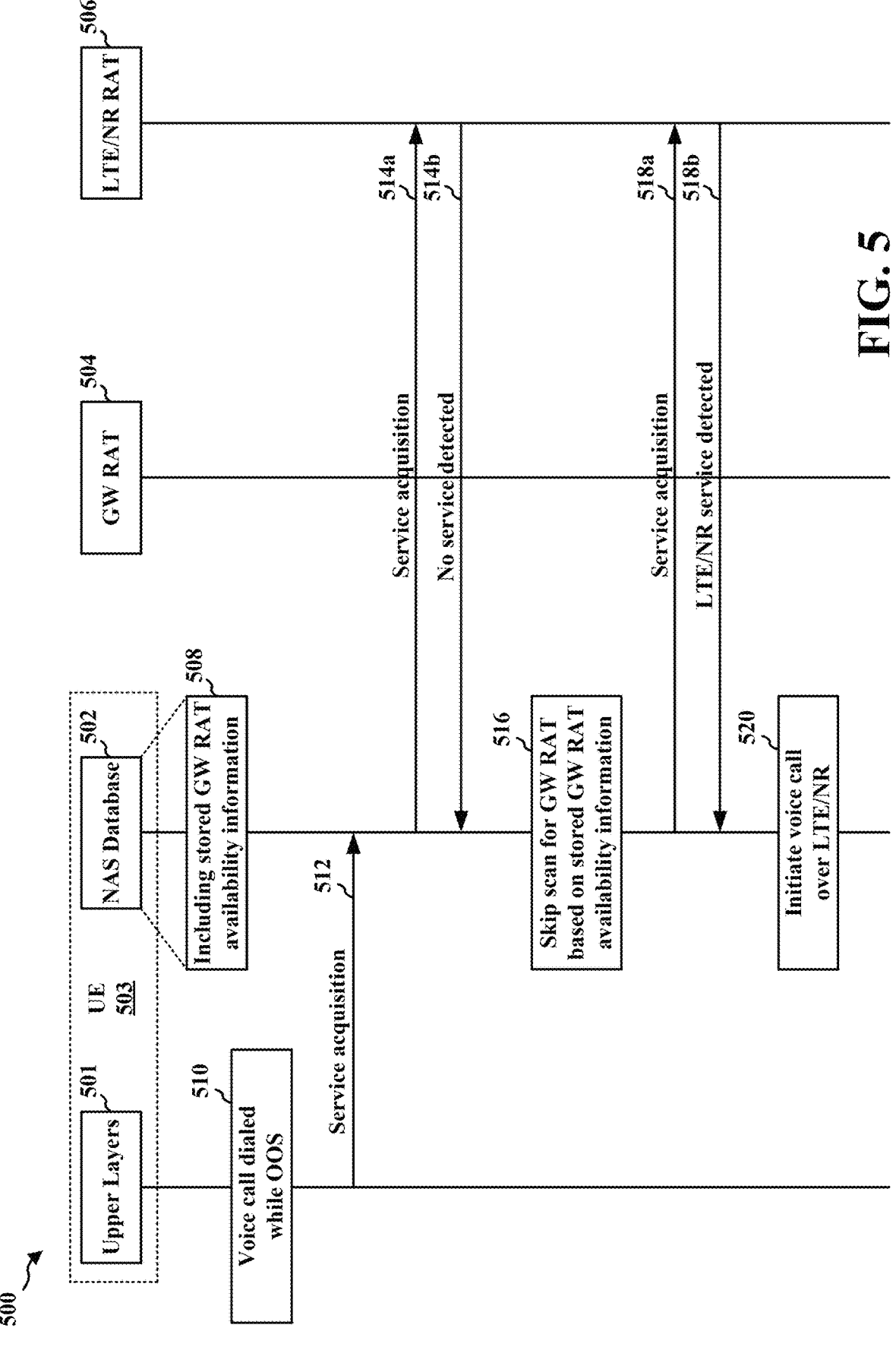
FIG. 5 is a call flow diagram illustrating communications between a plurality of network entities for a voice call initiated out-of-service (OOS).

FIG. 5 is a call flow diagram 500 illustrating communications between a plurality of network entities for a voice call initiated OOS. The plurality of network entities may include a GW RAT 504, an LTE/NR RAT 506, and a UE 503.

A NAS database 502 included at the UE 503 may receive communications from upper layers 501. The NAS database 502 may include, at 508, stored GW RAT availability information, which may be based on techniques of the call flow diagram 400 described in connection with FIG. 4.

If a voice call is dialed, at 510, while the UE 503 is OOS, the UE 503 may attempt to acquire service via different types of RATs supported by the UE 503 based on a full band scan for the different types of RATs. The upper layers 501 may indicate, at 512, a service acquisition request to the NAS database 502. The service acquisition request may also be indicated, at 514a, to the LTE/NR RAT 506. At 514b, the UE 503 may determine that no service is detected from the GW RAT 504.

Based on the NAS database 502 including, at 508, stored GW RAT availability information that indicates the GW RAT 504 is unavailable for the PLMN, the UE 503 may determine to skip, at 516, a scan for the GW RAT 504 associated with the PLMN (e.g., home PLMN/registered PLMN). Skipping, at 516, the scan for the GW RAT 504 based on the stored GW RAT availability information may be associated with an increased probability that the scan performed by the UE 503 will not detect the GW RAT 504 and may result in wasted time and battery power of the UE 503.

Instead, the UE 503 may limit a re-attempted scan to the LTE/NR RAT 506, which may allow the call dialed, at 510, while OOS to eventually be completed via VOLTE or VONR. Hence, the service acquisition request may be re-indicated, at 518a, to the LTE/NR RAT 506, rather than attempting to indicate the service acquisition request to the GW RAT 504. At 518b, the UE 503 may determine that LTE/NR service is detected from the LTE/NR RAT 506, such that the voice call may be initiated, at 520, over LTE/NR. Limiting the re-attempted scan to the LTE/NR RAT 506, and excluding the GW RAT 504, may prevent the call from failing based on a time out period associated with the scan for the GW RAT 504.

If the UE 503 is OOS when the voice call is dialed, at 510, and the UE 503 has access to the NAS database 502 indicative of whether the PLMN associated with the voice call includes an available GW RAT, the UE 503 may determine whether to exclude the GW RAT 504 from the scan or to perform a full band scan that includes the GW RAT 504. For example, when the voice call is dialed, at 510, the UE 503 may determine that the PLMN does not include an available GW RAT and may attempt to acquire the LTE/NR RAT 506 (e.g., at 514a-514b and/or 518a-518b). As illustrated in the diagram 500, the UE 503 may attempt to communicate with the LTE/NR RAT 506, but based on the stored GW RAT availability information included, at 508, in the NAS database 502, the UE 503 may not attempt to communicate with the GW RAT 504.

In examples where the UE 503 attempts to acquire/communicate with the GW RAT 504 when the GW RAT 504 is unavailable for the PLMN, the voice call dialed, at 510, may be delayed or may fail during an amount of time expended by the UE 503 to determine based on scanning procedures that the GW RAT 504 is unavailable for the particular PLMN. Being able to access the NAS database 502 including stored GW RAT availability information indicative for the PLMN may allow the UE 503 to more quickly determine a status of the GW RAT 504 with respect to the PLMN associated with the scan and to limited attempted scans/communications to the LTE/NR RAT 506. Thus, if the scan takes 5 seconds for the UE 503 to perform, the UE 503 may immediately re-attempt to scan for the LTE/NR RAT 506 and skip, at 516, scanning for the GW RAT 504. Within the 5 second duration of the scan, the UE 503 may be able to acquire LTE/NR service (e.g., at 518b) and initiate, at 520, the voice call over LTE/NR, rather than wasting time on scanning for GW service and having to determine that no service is available.

Figure 6:
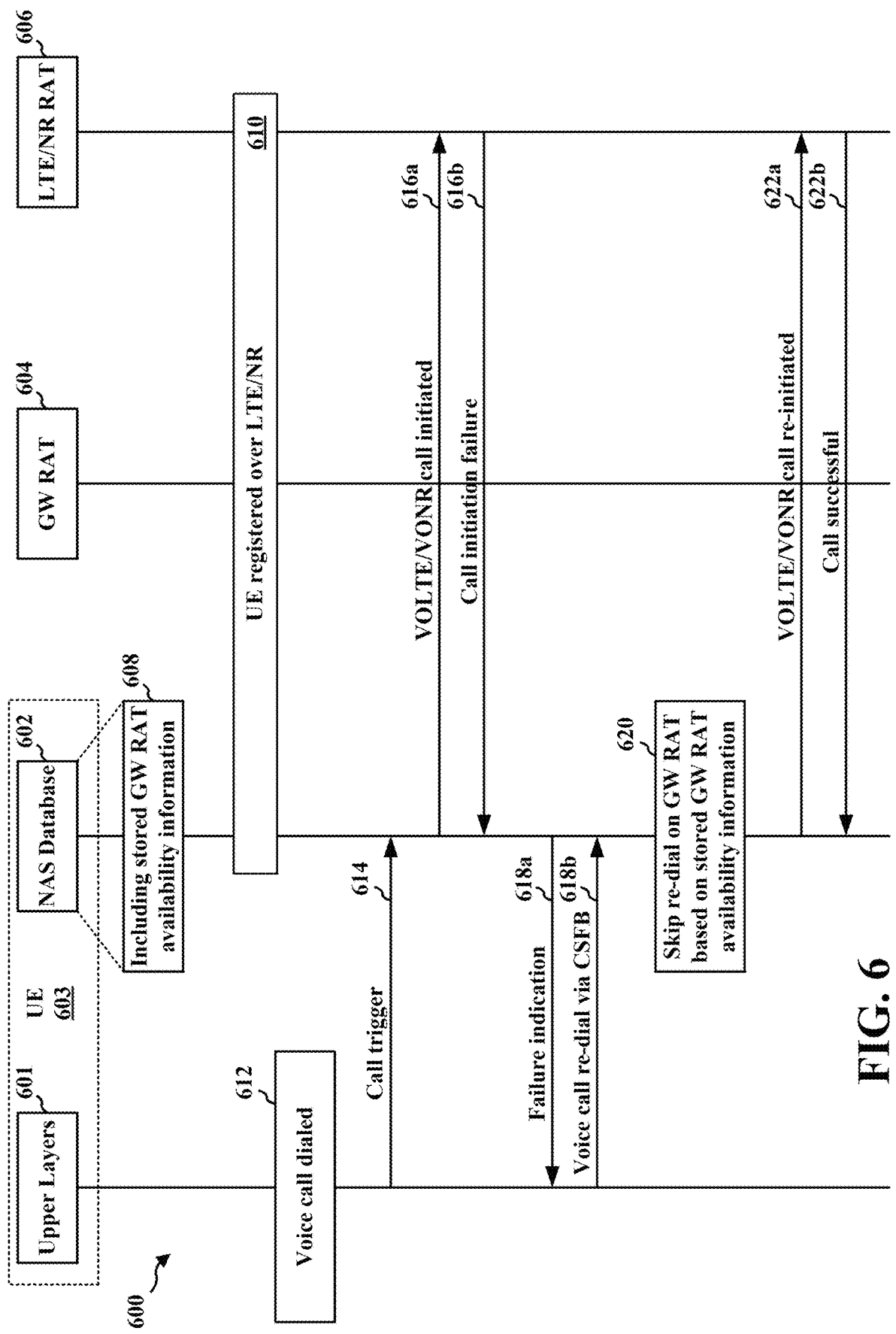
FIG. 6 is a call flow diagram illustrating communications between a plurality of network entities for re-dialed voice calls.

FIG. 6 is a call flow diagram 600 illustrating communications between a plurality of network entities for re-dialed voice calls. The plurality of network entities may include a GW RAT 604, an LTE/NR RAT 606, and a UE 603. A NAS database 602 included at the UE 603 may receive communications from upper layers 601. The NAS database 602 may include, at 608, stored GW RAT availability information, which may be based on techniques of the call flow diagram 400 described in connection with FIG. 4.

In cases where the UE 603 determines that the UE 603 is within a service area, the UE 603 may attempt to re-dial (e.g., at 618b) a failed voice call. The voice call may be dialed initially, at 612, while the UE 603 is registered, at 610, over LTE/NR. The upper layers 601 may indicate, at 614, a call trigger to the NAS database 602. The UE 603 may also initiate the voice call, at 616a, via VOLTE or VONR based on an established connection (e.g., at 610) with the LTE/NR RAT 606.

Without being able to access the NAS database 602 including the stored GW RAT availability information, at 608, for the PLMN, the UE 603 may attempt to perform a "silent" re-dial (e.g., automatic re-dial) on a circuit-switched (CS) RAT, such as the GW RAT 604, which may fail in locations where the GW RAT 604 is unavailable. Thus, the stored GW RAT availability information included, at 608, in the NAS database 602 may allow the UE 603 to immediately perform the silent redial via VOLTE or VONR when the GW RAT 604 is unavailable, rather than attempting to communicate with CS RATs and increasing a probability that the voice call will fail.

In an example, a VOLTE/VONR call initiated, at 616a, may be associated with a failed execution. For instance, the UE 603 may determine that a call initiation failure has occurred, at 616b, for the LTE/NR RAT 606. The call initiation failure, at 616b, my trigger a corresponding failure indication transmitted, at 618a, to the upper layers 601. Upon receiving the failure indication, at 618a, the upper layers 601 may initiate, at 618b, a call re-dial via a CS fallback procedure.

Rather than blindly attempting to re-initiate the call by scanning for the GW RAT 604, the UE 603 may access the NAS database 602, which may include, at 608, stored GW RAT availability information that indicates the GW RAT 602 is not available for the PLMN associated with the voice call. Thus, the UE 603 may skip, at 620, attempts to scan for/communicate with (e.g., re-dial) the GW RAT 604 based on the stored GW RAT availability information, as expending the time to perform such attempts may cause the voice call to fail (e.g., based on a time out period).

At 622a, the VOLTE/VONR call may be re-initiated based on the stored GW RAT availability information included, at 608, in the NAS database 602, and may exclude voice call initiation attempts associated with the GW RAT 604. For example, if an attempt, at 616a, to initiate a call via VOLTE fails, the UE 603 may re-attempt to initiate, at 622a, the call via VOLTE or via VONR, but not via GW communication. Techniques associated with skipping, at 620, the call re-dial on the GW RAT 604 may increase the probability that the re-attempted call, at 622b, will be successful. For example, the UE 603 may receive, at 622b, a call successful indication from the LTE/NR RAT 606 based on the call being re-initiated, at 622a, via VOLTE/VONR.

Figure 7:
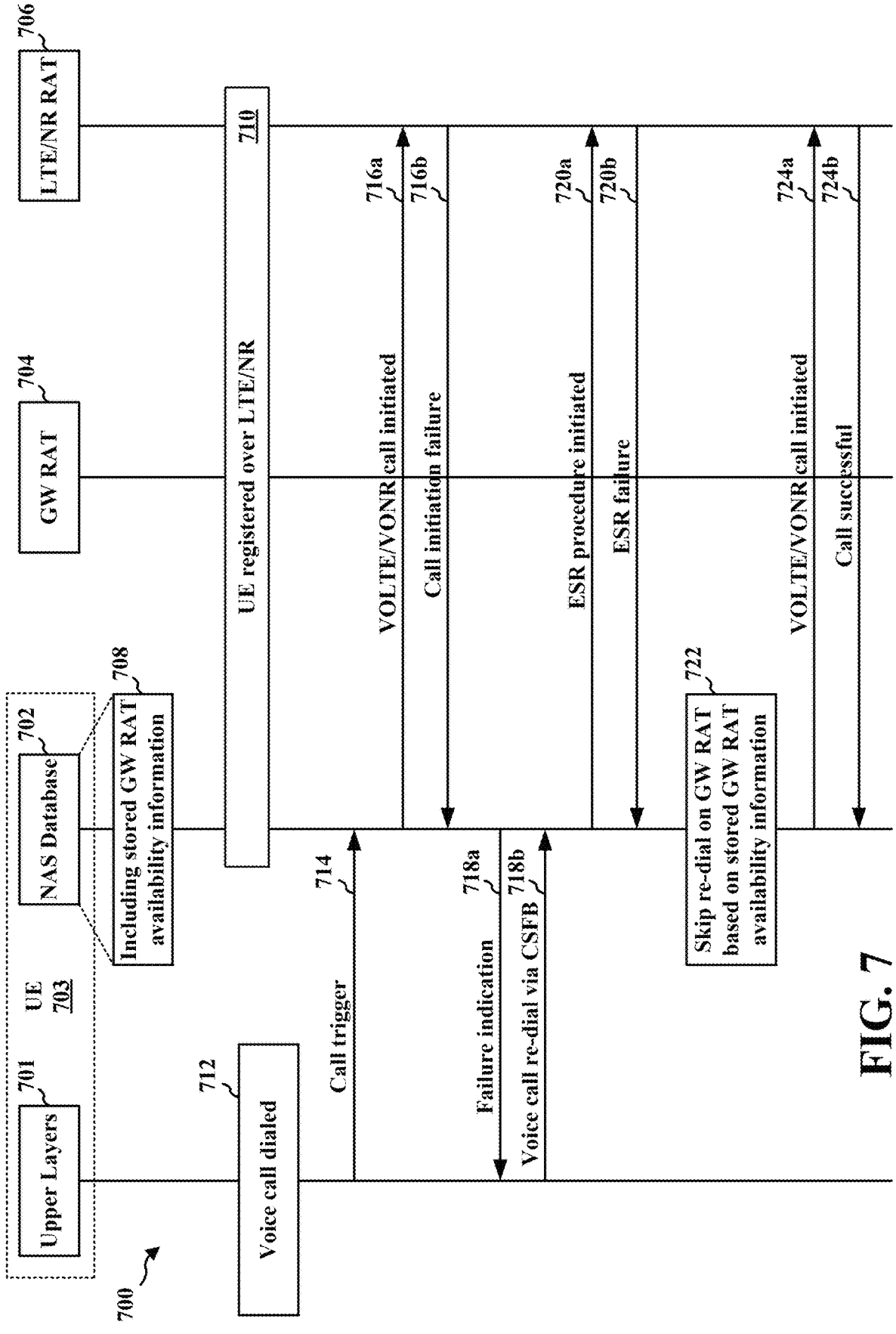
FIG. 7 is a call flow diagram illustrating communications between a plurality of network entities for extended search request (ESR) failures.

FIG. 7 is a call flow diagram 700 illustrating communications between a plurality of network entities for ESR failures. The plurality of network entities may include a GW RAT 704, an LTE/NR RAT 706, and a UE 703. A NAS database 702 included at the UE 703 may receive communications from upper layers 701. The NAS database 702 may include, at 708, stored GW RAT availability information, which may be based on techniques of the call flow diagram 400 described in connection with FIG. 4.

A voice call may be dialed initially, at 712, while the UE 703 is registered, at 710, over LTE/NR. The upper layers 701 may indicate, at 714, a call trigger to the NAS database 702. The UE 703 may also initiate the voice call, at 716a, via VOLTE or VONR based on an established connection (e.g., at 710) with the LTE/NR RAT 706. In an example, the VOLTE/VONR call initiated, at 716a, may be associated with a failed execution. For instance, the UE 703 may determine that a call initiation failure has occurred, at 716b, for the LTE/NR RAT 706. The call initiation failure, at 716b, my trigger a corresponding failure indication transmitted, at 718a, to the upper layers 701. Upon receiving the failure indication, at 718a, the upper layers 701 may initiate, at 718b, a call re-dial via a CS fallback procedure.

The re-dialed call, at 718b, via the CS fallback procedure may cause the UE 703 to initiate, at 720a, an ESR procedure with the LTE/NR RAT 706. An ESR procedure may include the UE 703 being in an idle mode or a connected mode and being configured to use CS fallback based on a mobile originating CS fallback request from the upper layers 701. However, at 720b, the UE 703 may determine that an ESR failure has occurred for the LTE/NR RAT 706 in association with ESR procedure initiated, at 720a, by the UE 703. Without being able to access the NAS database 702 including the stored GW RAT availability information, at 708, for the PLMN, the UE 703 may re-attempt the ESR procedure with the GW RAT 704, which may cause the call to fail in locations where the GW RAT 704 is unavailable.

At 722, the UE 703 may skip a re-dial on the GW RAT 704 based on the stored GW RAT availability information included, at 708, in the NAS database 702. That is, rather than scanning for the GW RAT 704 after the ESR failure, at 720b, the UE 703 may determine based on an indication in the NAS database 702 that the GW RAT 704 is unavailable for the PLMN, and may skip (e.g., at 722) a CS fallback procedure associated with the GW RAT 704.

At 724a, the VOLTE/VONR call may be re-initiated based on the stored GW RAT availability information included, at 708, in the NAS database 702 and the skipped CS fallback procedure associated with the GW RAT 704, which may increase a probability that the re-attempted/re-initiated call (e.g., at 724a) will be successful. If the UE 703 is registered, at 710, over LTE and the voice call fails (e.g., at 716b) via LTE, the CS fallback procedure may cause the UE 703 to scan for the GW RAT 704. However, based on the indication included in the NAS database 702, the UE 703 may exclude/skip (e.g., at 722) scans for the GW RAT 704 when the GW RAT 704 is unavailable. Techniques associated with skipping, at 722, the call re-dial on the GW RAT 704 may increase the probability that the re-attempted call, at 724a, will be successful. For example, the UE 703 may receive, at 724b, a call successful indication from the LTE/NR RAT 706 based on the call being re-initiated, at 724a, via VOLTE/VONR.

Figure 8:
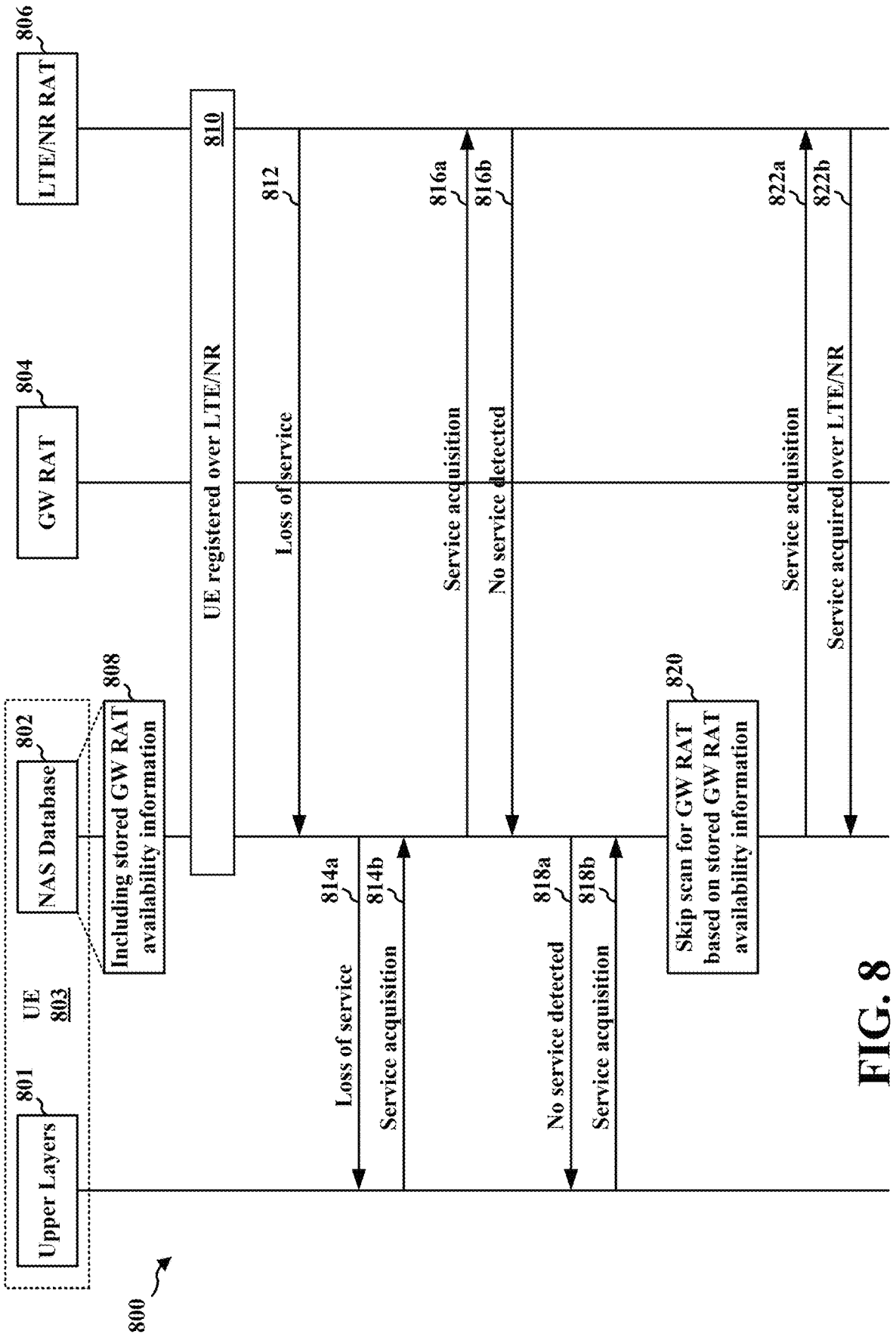
FIG. 8 is a call flow diagram illustrating communications between a plurality of network entities for OOS recovery.

FIG. 8 is a call flow diagram 800 illustrating communications between a plurality of network entities for OOS recovery. The plurality of network entities may include a GW RAT 804, an LTE/NR RAT 806, and a UE 803. A NAS database 802 included at the UE 803 may receive communications from upper layers 801. The NAS database 802 may include, at 808, stored GW RAT availability information, which may be based on techniques of the call flow diagram 400 described in connection with FIG. 4.

The UE 803 may be initially registered, at 810, over LTE/NR, but may experience a loss of service, at 812, with the LTE/NR RAT 806. The loss of service may be indicated, at 814a, to the upper layers 801. Based on the indication received, at 814a, the upper layers 801 may indicate, at 814b, a service acquisition request to the NAS database 802. The service acquisition request may also be indicated, at 816a, to the LTE/NR RAT 806. At 816b, the UE 803 may determine that no service is detected from the GW RAT 804. At 818a, an indication that no service is detected may be indicated to the upper layers 801, which may again indicate, at 818b, a service acquisition request to the NAS database 802.

An OOS recovery procedure may be based on periodically performing a full band scan to recover the service lost, at 812, for the PLMN (e.g., home PLMN/registered PLMN). While the full band scan may provide increased opportunities for recovery (e.g., via the GW RAT 804), performing the full band scan may be associated with a power consumption cost, as the UE 803 may be attempting to scan for an increased number of different RATs in order to restore service to the UE 803. Thus, based on the stored GW RAT availability information included, at 808, in the NAS database 802, the UE 803 may determine that the GW RAT 804 is unavailable for the PLMN. Hence, the UE 803 may skip, at 820, a scan for the GW RAT 804 based on the stored GW RAT availability information to decrease a scan time of the UE 803 and improve a battery life/performance of the UE 803. In further examples, the UE 803 may determine to skip, at 820, the scan for the GW RAT 804 periodically. For instance, the UE 803 may skip, at 820, the scan for the GW RAT 804 once every two rounds of scanning to provide a more balanced tradeoff between re-acquiring service and conserving the battery power of the UE 803.

Battery power may be conserved based on reduced signaling at the UE 803. After the UE 803 loses service, at 812, the UE 803 may perform a scan for a plurality of different types of RATs, including the GW RAT 804. However, based on the NAS database 802 including an indication that the GW RAT 804 is unavailable, the UE 803 may exclude/skip, at 820, a scan for the GW RAT 804. That is, the UE 803 may indicate, at 818a, to the upper layers 801 when the service is lost, and limit the scan to the LTE/NR RAT 806.

The UE 803 may enter a "sleep" mode for a first period of time where the UE 803 is not attempting the OOS recovery procedure and may enter a "wake up" mode for a second period of time when the UE 803 is attempting, at 822a, to re-acquire service. In each round of scanning, the UE 803 may exclude attempts to acquire the GW RAT 804 and limit the scan to attempted service acquisitions for the LTE/NR RAT 806. UE battery power and signaling load may be reduced based on the UE 803 being able to determine from the NAS database 802 that the GW RAT 804 is unavailable and that the UE 803 should attempt to perform the OOS recovery procedure via the LTE/NR RAT 806.

Stored GW RAT availability information included, at 808, in the NAS database 802 may be used by the UE 803 to increase a success rate of UE procedures, such as voice calls. The NAS database 802 may include indications that increase a probability of the UE 803 being able to acquire service for communications with the network before procedures, such as voice calls, time out/fail. That is, the UE 803 may determine to perform a more focused scan for available RATs based on the information stored in the NAS database 802, rather than performing a full band scan that could result in a failed call, time delays, and/or power consumption costs. For example, a setup time for procedures such as voice calls may also be decreased, as reduced scanning procedures may allow the UE 803 to more quickly latch to an available RAT. Accordingly, the UE 803 may transmit, at 822a, a service acquisition request to the LTE/NR RAT 806 and, at 822b, the UE 803 may receive an indication from the LTE/NR RAT 806 that service has been acquired over LTE/NR.

FIG. 9 is a flowchart 900 of a method of wireless communication. The method may be performed by a UE (e.g., the UE 104, 403, 503, 603, 703, 803; the apparatus 1102; etc.), which may include the memory 360 and which may be the entire UE 104, 403, 503, 603, 703, 803 or a component of the UE 104, 403, 503, 603, 703, 803, such as the TX processor 368, the RX processor 356, and/or the controller/processor 359.

At 902, the UE may receive, from a database, an indication that a first RAT is unavailable for communications associated with a PLMN—the indication that the first RAT is unavailable is based on one or more unsuccessful scans for the first RAT. For example, referring to FIGS. 4-8, the NAS database 402, 502, 602, 702, 802 may store/include, at 426, 508, 608, 708, 808, GW RAT availability information, which may be used to indicate for 516, 620, 722, 820 whether the GW RAT 404, 504, 604, 704, 804 is available based on the UE 403 determining, at 422, that N consecutive scans for the GW RAT 404 have been unsuccessful. The reception, at 902, may be performed by the reception component 1130 of the apparatus 1102 in FIG. 11.

At 904, the UE may scan for a second RAT based on a skipped scan for the first RAT—the skipped scan is based on the indication that the first RAT is unavailable. A "skipped scan" may refer to a scan for a RAT that the UE would have otherwise performed, absent receiving an indication from the NAS database indicating that the RAT is unavailable for the PLMN. For example, referring to FIGS. 5-8, the UE 503, 603, 703, 803 may scan/re-dial, at 518a, 622a, 724a, 822a, for the LTE/NR RAT 506, 606, 706, 806 based on skipping, at 516, 620, 722, 820, a scan/re-dial for the GW RAT 504, 604, 704, 804, where the skipped scan is based on the stored GW RAT availability information included, at 508, 608, 708, 808, in the NAS database 502, 602, 702, 802. The scan, at 904, may be performed by the scanner component 1140 of the apparatus 1102 in FIG. 11.

At 906, the UE may communicate with the PLMN based on the scan for the second RAT and the skipped scan for the first RAT. For example, referring to FIGS. 5-8, the UE 503, 603, 703, 803 may communicate with the LTE/NR RAT 506, 606, 706, 806 based on skipping, at 516, 620, 722, 820, the scan/re-dial for the GW RAT 504, 604, 704, 804 and re-attempting, at 518b, 622a, 724a, 822a, the scan/re-dial for the LTE/NR RAT 506, 606, 706, 806. The communicating, at 906, may be performed by the communication component 1148 of the apparatus 1102 in FIG. 11.

FIG. 10 is a flowchart 1000 of a method of wireless communication. The method may be performed by a UE (e.g., the UE 104, 403, 503, 603, 703, 803; the apparatus 1102; etc.), which may include the memory 360 and which may be the entire UE 104, 403, 503, 603, 703, 803 or a component of the UE 104, 403, 503, 603, 703, 803, such as the TX processor 368, the RX processor 356, and/or the controller/processor 359.

At 1002, the UE may scan for a first RAT prior to receiving an indication that the first RAT is unavailable—the scan for the first RAT is associated with at least one of one or more unsuccessful scans or a skipped scan for the first RAT. For example, referring to FIGS. 4-5 and 8, the UE 403 may transmit, at 412a, a service acquisition for a GW RAT 404 prior to receiving, at 414, an indication that no service is detected for the GW RAT 404. A scan (e.g., at 420a-420b) for the GW RAT 404 may be based on N unsuccessful scans (e.g., at 420a-420b) for the GW RAT 404. The scan, at 420a-420b, for the GW RAT 404 may also be associated with the skipped scan, at 516 and 820, for the GW RAT 504/804. The scanner, at 1002, may be performed by the scanner component 1140 of the apparatus 1102 in FIG. 11.

At 1004, the UE may receive, from a database, the indication that the first RAT is unavailable for communications associated with a PLMN—the indication that the first RAT is unavailable is based on the one or more unsuccessful scans for the first RAT. For example, referring to FIGS. 4-8, the NAS database 402, 502, 602, 702, 802 may store/include, at 426, 508, 608, 708, 808, GW RAT availability information, which may be used to indicate for 516, 620, 722, 820 whether the GW RAT 404, 504, 604, 704, 804 is available based on the UE 403 determining, at 422, that N consecutive scans for the GW RAT 404 have been unsuccessful. The reception, at 1004, may be performed by the reception component 1130 of the apparatus 1102 in FIG. 11.

At 1006, the UE may update the database to include the indication that the first RAT is unavailable based on each scan of N successive scans (e.g., 3 successive scans) for the first RAT being unsuccessful. For example, referring to FIG. 4, the UE 403 may store, at 426, GW RAT availability information for a PLMN in the NAS database 402 based on the UE 403 determining, at 422, that N consecutive scans for the GW RAT 404 have been unsuccessful. The updating, at 1006, may be performed by the updater component 1142 of the apparatus 1102 in FIG. 11.

At 1008, the UE may attempt to acquire service for the communications associated with the PLMN—the attempt to acquire the service is unsuccessful. The communications associated with the PLMN may be VOLTE/VONR call information transmitted between the UE and a RAT. For example, referring to FIGS. 5 and 8, the UE 503, 803 may attempt, at 514a, 816a, to acquire service with the LTE/NR RAT 506, 806. However, the UE 503, 803 may receive, at 514b, 816b, an indication that no service is detected for the LTE/NR RAT 506, 806. The attempt, at 1008, may be performed by the attempting component 1144 of the apparatus 1102 in FIG. 11.

At 1010, the UE may scan for a second RAT based on a skipped scan for the first RAT—the skipped scan is based on the indication that the first RAT is unavailable. For example, referring to FIGS. 5-8, the UE 503, 603, 703, 803 may scan/re-dial, at 518a, 622a, 724a, 822a, for the LTE/NR RAT 506, 606, 706, 806 based on skipping, at 516, 620, 722, 820, a scan/re-dial for the GW RAT 504, 604, 704, 804, where the skipped scan is based on the stored GW RAT availability information included, at 508, 608, 708, 808, in the NAS database 502, 602, 702, 802. The scanner, at 1010, may be performed by the scanner component 1140 of the apparatus 1102 in FIG. 11.

At 1012, the UE may re-attempt to acquire the service for the communications associated with the PLMN based on the scan for the second RAT and the skipped scan for the first RAT. For example, referring to FIGS. 5 and 8, the UE 503, 803 may re-attempt, at 518*a*, 822*a*, to acquire service with the LTE/NR RAT 506, 806 based on skipping, at 516, 820, the scan for the GW RAT 504, 804. The re-attempt, at 1012, may be performed by the attempting component 1144 of the apparatus 1102 in FIG. 11.

At 1014, the UE may initiate, via the second RAT, the communications associated with the PLMN—an initiation of the communications associated with the second RAT is unsuccessful. For example, referring to FIGS. 6-7, the UE 603, 703 may initiate, at 616*a*, 716*a*, VOLTE/VONR call with the LTE/NR RAT 606, 706. However, the UE 603, 703 may receive, at 616*b*, 716*b*, an indication that call initiation has failed. The initiation, at 1014, may be performed by the initiation component 1146 of the apparatus 1102 in FIG. 11.

At 1016, the UE may re-initiate, via the second RAT, the communications associated with the PLMN based on the scan for the second RAT and the skipped scan for the first RAT. For example, referring to FIGS. 6-7, the UE 603, 703 may re-initiate, at 622*a*, 724*a*, the VOLTE/VONR call with the LTE/NR RAT 606, 706, based on skipping, at 620, 722, a re-dial for the GW RAT 604, 704, where the skipped re-dial is based on the stored GW RAT availability information included, at 608, 708, in the NAS database 602, 702. The re-initiation, at 1016, may be performed by the initiation component 1146 of the apparatus 1102 in FIG. 11.

At 1018, the UE may communicate with the PLMN based on the scan for the second RAT and the skipped scan for the first RAT. For example, referring to FIGS. 5-8, the UE 503, 603, 703, 803 may communicate with the LTE/NR RAT 506, 606, 706, 806 based on skipping, at 516, 620, 722, 820, the scan/re-dial for the GW RAT 504, 604, 704, 804 and re-attempting, at 518*b*, 622*a*, 724*a*, 822*a*, the scan/re-dial for the LTE/NR RAT 506, 606, 706, 806. The communicating, at 1018, may be performed by the communication component 1148 of the apparatus 1102 in FIG. 11.

Figure 11:
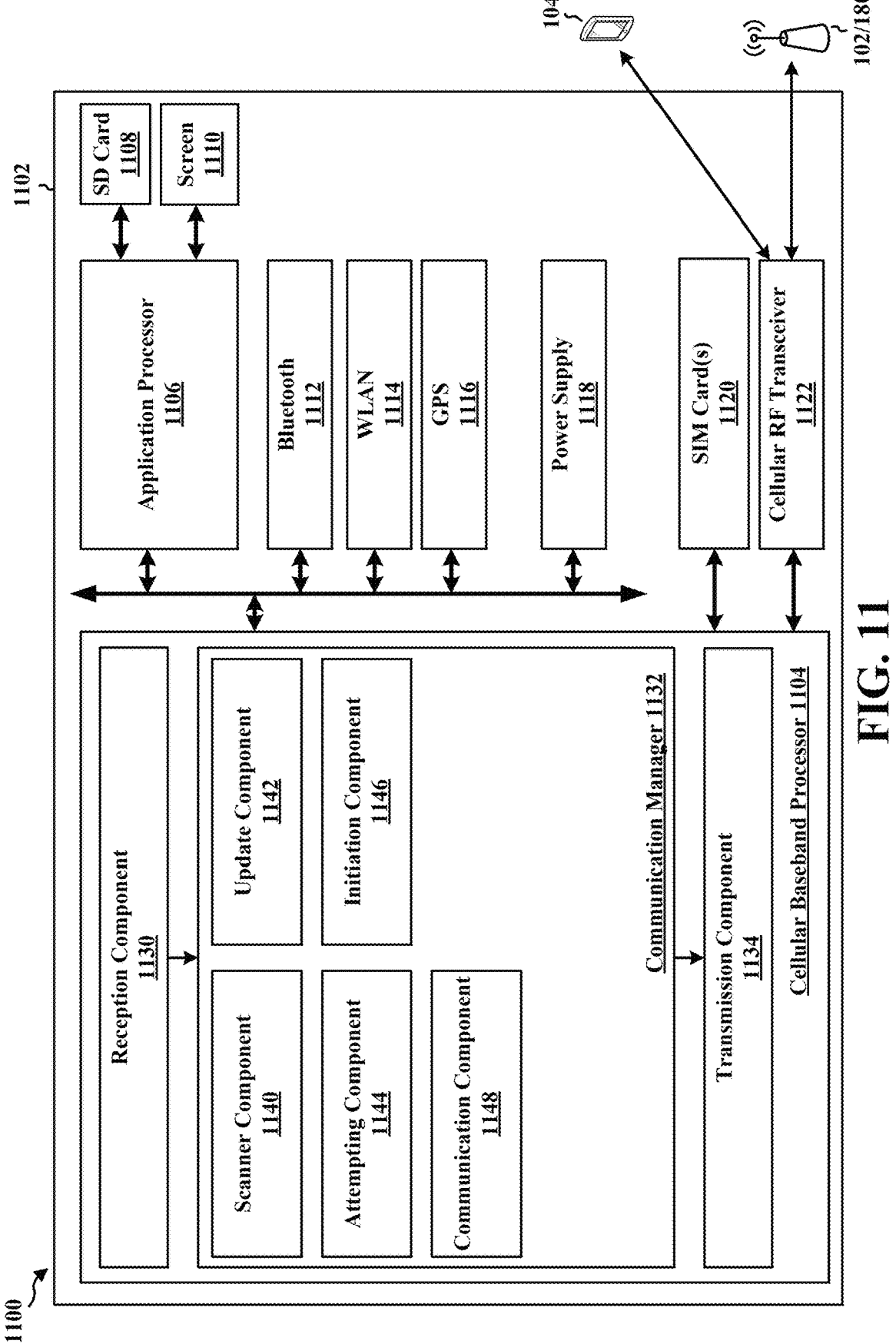
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The reception component 1130 is configured, e.g., as described in connection with 902 and 1004, to receive, from a database, the indication that the first RAT is unavailable for communications associated with a PLMN—the indication that the first RAT is unavailable is based on the one or more unsuccessful scans for the first RAT. The communication manager 1132 includes a scanner component 1140 that is configured, e.g., as described in connection with 904, 1002, and 1010, to scan for a first RAT prior to receiving an indication that the first RAT is unavailable—the scan for the first RAT is associated with at least one of one or more unsuccessful scans or a skipped scan for the first RAT; and to scan for a second RAT based on a skipped scan for the first RAT—the skipped scan is based on the indication that the first RAT is unavailable. The communication manager 1132 further includes an update component 1142 that is configured, e.g., as described in connection with 1006, to update the database to include the indication that the first RAT is unavailable based on each scan of N successive scans for the first RAT being unsuccessful. The communication manager 1132 further includes an attempting component 1144 that is configured, e.g., as described in connection with 1008 and 1012, to attempt to acquire service for the communications associated with the PLMN—the attempt to acquire the service is unsuccessful; and to re-attempt to acquire the service for the communications associated with the PLMN based on the scan for the second RAT and the skipped scan for the first RAT. The communication manager 1132 further includes an initiation component 1146 that is configured, e.g., as described in connection with 1014 and 1016, to initiate, via the second RAT, the communications associated with the PLMN—an initiation of the communications associated with the second RAT is unsuccessful; and to re-initiate, via the second RAT, the communications associated with the PLMN based on the scan for the second RAT and the skipped scan for the first RAT. The communication manager 1132 further includes a communication component 1148 that is configured, e.g., as described in connection with 906 and 1018, to communicate with the PLMN based on the scan for the second RAT and the skipped scan for the first RAT.

The apparatus may include additional components that perform each of the blocks of the algorithm in the flowcharts of FIGS. 9-10. As such, each block in the flowcharts of FIGS. 9-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, includes means for receiving, from a database, an indication that a first RAT is unavailable for communications associated with a PLMN, the indication that the first RAT is unavailable being based on one or more unsuccessful scans for the first RAT; means for scanning for a second RAT based on a skipped scan for the first RAT, the skipped scan being based on the indication that the first RAT is unavailable; and means for communicating with the PLMN based on the scan for the second RAT and the skipped scan for the first RAT. The apparatus 1102 further includes means for updating the database to include the indication that the first RAT is unavailable based on each scan of the N successive scans for the first RAT being unsuccessful. The apparatus 1102 further includes means for attempting to acquire service for the communications associated with the PLMN, where the attempt to acquire the service is unsuccessful; and means for re-attempting to acquire the service for the communications associated with the PLMN based on the scan for the second RAT and the skipped scan for the first RAT. The apparatus 1102 further includes means for initiating, via the second RAT, the communications associated with the PLMN, where an initiation of the communications associated with the second RAT is unsuccessful; and means for re-initiating, via the second RAT, the communications associated with the PLMN based on the scan for the second RAT and the skipped scan for the first RAT. The apparatus 1102 further includes means for scanning for the first RAT prior to receiving the indication that the first RAT is unavailable, where the scan for the first RAT is associated with at least one of the one or more unsuccessful scans or the skipped scan for the first RAT.

The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication including at least one processor coupled to a memory and configured to receive, from a database, an indication that a first RAT is unavailable for communications associated with a PLMN, the indication that the first RAT is unavailable being based on one or more unsuccessful scans for the first RAT; scan for a second RAT based on a skipped scan for the first RAT, the skipped scan being based on the indication that the first RAT is unavailable; and communicate with the PLMN based on the scan for the second RAT and the skipped scan for the first RAT.

Aspect 2 may be combined with aspect 1 and includes that the one or more unsuccessful scans for the first RAT correspond to N successive scans for the first RAT, where a value of N is a configurable value.

Aspect 3 may be combined with any of aspects 1-2 and includes that the at least one processor is further configured to update the database to include the indication that the first RAT is unavailable based on each scan of the N successive scans for the first RAT being unsuccessful.

Aspect 4 may be combined with any of aspects 1-3 and includes that each scan of the N successive scans for the first RAT is performed based on a timer.

Aspect 5 may be combined with any of aspects 1-4 and includes that the value of N is incremented by 1 after each scan of the one or more unsuccessful scans for the first RAT.

Aspect 6 may be combined with any of aspects 1-5 and includes that the at least one processor is further configured to: attempt to acquire service for the communications associated with the PLMN, where the attempt to acquire the service is unsuccessful; and re-attempt to acquire the service for the communications associated with the PLMN based on the scan for the second RAT and the skipped scan for the first RAT.

Aspect 7 may be combined with any of aspects 1-6 and includes that the re-attempt to acquire the service is associated with at least one of an initiation of a voice call in a non-service area or an OOS recovery procedure.

Aspect 8 may be combined with any of aspects 1-7 and includes that the at least one processor is further configured to: initiate, via the second RAT, the communications associated with the PLMN, where an initiation of the communications associated with the second RAT is unsuccessful; and re-initiate, via the second RAT, the communications associated with the PLMN based on the scan for the second RAT and the skipped scan for the first RAT.

Aspect 9 may be combined with any of aspects 1-8 and includes that the re-initiation of the communications associated with the PLMN corresponds to a redial of a voice call via the second RAT.

Aspect 10 may be combined with any of aspects 1-9 and includes that the re-initiation of the communications associated with the PLMN is based on an ESR procedure being unsuccessful.

Aspect 11 may be combined with any of aspects 1-10 and includes that the scan for the first RAT is skipped periodically based on the indication that the first RAT is unavailable.

Aspect 12 may be combined with any of aspects 1-11 and includes that the first RAT corresponds to a GW RAT and the second RAT corresponds to at least one of an LTE RAT or an NR RAT.

Aspect 13 may be combined with any of aspects 1-12 and includes that the at least one processor is further configured to scan for the first RAT prior to receiving the indication that the first RAT is unavailable, where the scan for the first RAT is associated with at least one of the one or more unsuccessful scans or the skipped scan for the first RAT.

Aspect 14 may be combined with any of aspects 1-13 and further includes at least one of an antenna or a transceiver coupled to the at least one processor.

Aspect 15 is a method of wireless communication for implementing any of aspects 1-14.

Aspect 16 is an apparatus for wireless communication including means for implementing any of aspects 1-14.

Aspect 17 is a non-transitory computer-readable medium storing computer executable code, the code when executed by at least one processor causes the at least one processor to implement any of aspects 1-14.

What is claimed is:

1. An apparatus for wireless communication at a user equipment (UE), comprising:

memory; and at least one processor coupled to the memory and configured to:

scan, during an ON period, a full band of all radio access technologies (RATs) supported by the UE for attempting to acquire service for communications associated with a public land mobile network (PLMN), wherein the scan includes one or more scans for a first RAT, wherein the full band of all RATs supported by the UE includes at least one bandwidth other than a bandwidth associated with the first RAT;

store, in a non-access stratum (NAS) database of the UE and responsive to the one or more scans for the first RAT being unsuccessful, an indication that the first RAT is unavailable for the communications associated with the PLMN;

attempt to acquire service for the communications associated with the PLMN, wherein the attempt to acquire the service is unsuccessful;

scan for a second RAT for re-attempting to acquire the service for the communications associated with the PLMN based on a skipped scan for the first RAT, the skipped scan being based on the indication stored in the NAS database that the first RAT is unavailable for the communications associated with the PLMN; and communicate with the PLMN based on the scan for the second RAT and the skipped scan for the first RAT.

2. The apparatus of claim 1, wherein the one or more unsuccessful scans for the first RAT correspond to N successive scans for the first RAT, where a value of N is a configurable value.

3. The apparatus of claim 2, wherein the at least one processor is further configured to update the NAS database to include the indication that the first RAT is unavailable for the communications associated with the PLMN based on each scan of the N successive scans for the first RAT being unsuccessful.

4. The apparatus of claim 2, wherein each scan of the N successive scans for the first RAT is performed based on a timer.

5. The apparatus of claim 2, wherein the value of N is incremented by 1 after each scan of the one or more unsuccessful scans for the first RAT.

6. The apparatus of claim 1, wherein the re-attempt to acquire the service is associated with at least one of an initiation of a voice call in a non-service area or an out-of-service (OOS) recovery procedure.

7. The apparatus of claim 1, wherein the at least one processor is further configured to:

initiate, via the second RAT, the communications associated with the PLMN, wherein an initiation of the communications associated with the second RAT is unsuccessful; and re-initiate, via the second RAT, the communications associated with the PLMN based on the scan for the second RAT and the skipped scan for the first RAT.

8. The apparatus of claim 7, wherein the re-initiation of the communications associated with the PLMN corresponds to a redial of a voice call via the second RAT.

9. The apparatus of claim 7, wherein the re-initiation of the communications associated with the PLMN is based on an extended service request (ESR) procedure being unsuccessful.

10. The apparatus of claim 1, wherein the scan for the first RAT is skipped periodically based on the indication that the first RAT is unavailable.

11. The apparatus of claim 1, wherein the first RAT corresponds to a global system for mobiles (GSM)/wideband code division multiple access (WCDMA) RAT and the second RAT corresponds to at least one of a long term evolution (LTE) RAT or a new radio (NR) RAT.

12. The apparatus of claim 1, further comprising at least one of an antenna or a transceiver coupled to the at least one processor.

13. A method of wireless communication at a user equipment (UE), comprising:

scanning, during an ON period, a full band of all radio access technologies (RATs) supported by the UE for attempting to acquire service for communications associated with a public land mobile network (PLMN), wherein the scan includes one or more scans for a first RAT, wherein the full band of all RATs supported by the UE includes at least one bandwidth other than a bandwidth associated with the first RAT;

storing, in a non-access stratum (NAS) database of the UE and responsive to the one or more scans for the first RAT being unsuccessful, an indication that the first RAT is unavailable for the communications associated with the PLMN;

attempting to acquire service for the communications associated with the PLMN, wherein the attempt to acquire the service is unsuccessful;

scanning for a second RAT for re-attempting to acquire the service for the communications associated with the PLMN based on a skipped scan for the first RAT, the skipped scan being based on the indication stored in the NAS database that the first RAT is unavailable for the communications associated with the PLMN; and communicating with the PLMN based on the scan for the second RAT and the skipped scan for the first RAT.

14. The method of claim 13, wherein the one or more unsuccessful scans for the first RAT correspond to N successive scans for the first RAT, where a value of N is a configurable value.

15. The method of claim 14, further comprising updating the NAS database to include the indication that the first RAT is unavailable for the communications associated with the PLMN based on each scan of the N successive scans for the first RAT being unsuccessful.

16. The method of claim 14, wherein each scan of the N successive scans for the first RAT is performed based on a timer.

17. The method of claim 14, wherein the value of N is incremented by 1 after each scan of the one or more unsuccessful scans for the first RAT.

18. The method of claim 13, wherein the re-attempt to acquire the service is associated with at least one of an initiation of a voice call in a non-service area or an out-of-service (OOS) recovery procedure.

19. The method of claim 13, further comprising:

initiating, via the second RAT, the communications associated with the PLMN, wherein an initiation of the communications associated with the second RAT is unsuccessful; and re-initiating, via the second RAT, the communications associated with the PLMN based on the scan for the second RAT and the skipped scan for the first RAT.

20. The method of claim 19, wherein the re-initiation of the communications associated with the PLMN corresponds to a redial of a voice call via the second RAT.

21. The method of claim 19, wherein the re-initiation of the communications associated with the PLMN is based on an extended service request (ESR) procedure being unsuccessful.

22. The method of claim 13, wherein the scan for the first RAT is skipped periodically based on the indication that the first RAT is unavailable.

23. The method of claim 13, wherein the first RAT corresponds to a global system for mobiles (GSM)/wideband code division multiple access (WCDMA) RAT and the second RAT corresponds to at least one of a long term evolution (LTE) RAT or a new radio (NR) RAT.

24. An apparatus for wireless communication at a user equipment (UE), comprising:

means for scanning, during an ON period, a full band of all radio access technologies (RATs) supported by the UE for attempting to acquire service for communications associated with a public land mobile network (PLMN), wherein the scan includes one or more scans for a first RAT, wherein the full band of all RATs supported by the UE includes at least one bandwidth other than a bandwidth associated with the first RAT;

means for storing, in a non-access stratum (NAS) database of the UE and responsive to the one or more scans for the first RAT being unsuccessful, an indication that the first RAT is unavailable for the communications associated with the PLMN;

means for attempting to acquire service for the communications associated with the PLMN, wherein the attempt to acquire the service is unsuccessful;

means for scanning for a second RAT for re-attempting to acquire the service for the communications associated with the PLMN based on a skipped scan for the first RAT, the skipped scan being based on the indication store in the NAS database that the first RAT is unavailable for the communications associated with the PLMN; and means for communicating with the PLMN based on the scan for the second RAT and the skipped scan for the first RAT.

25. The apparatus of claim 24, wherein the first RAT corresponds to a global system for mobiles (GSM)/wideband code division multiple access (WCDMA) RAT and the second RAT corresponds to at least one of a long term evolution (LTE) RAT or a new radio (NR) RAT.

26. A non-transitory computer-readable medium storing computer executable code at a user equipment (UE), the code when executed by at least one processor causes the at least one processor to:

scan, during an ON period, a full band of all radio access technologies (RATs) supported by the UE for attempting to acquire service for communications associated with a public land mobile network (PLMN), wherein the scan includes one or more scans for a first RAT, wherein the full band of all RATs supported by the UE includes at least one bandwidth other than a bandwidth associated with the first RAT;

store, in a non-access stratum (NAS) database of the UE and responsive to the one or more scans for the first RAT being unsuccessful, an indication that the first RAT is unavailable for the communications associated with the PLMN;

attempt to acquire service for the communications associated with the PLMN, wherein the attempt to acquire the service is unsuccessful;

scan for a second RAT for re-attempting to acquire the service for the communications associated with the PLMN based on a skipped scan for the first RAT, the skipped scan being based on the indication stored in the NAS database that the first RAT is unavailable for the communications associated with the PLMN; and communicate with the PLMN based on the scan for the second RAT and the skipped scan for the first RAT.

* * * * *